United States Patent [19]

Kondoh

[11] Patent Number: 5,096,351

[45] Date of Patent: Mar. 17, 1992

[54] CASSETTE LOADING AND UNLOADING DEVICE

[75] Inventor: Masahiko Kondoh, Kanagawa, Japan

[73] Assignee: Fuji Photo Film Co., Ltd., Kanagawa, Japan

[21] Appl. No.: 574,975

[22] Filed: Aug. 30, 1990

[30] Foreign Application Priority Data

| Aug. 31, 1989 | [JP] | Japan | 1-227924 |
| Aug. 31, 1989 | [JP] | Japan | 1-227925 |
| Aug. 31, 1989 | [JP] | Japan | 1-227926 |
| Aug. 31, 1989 | [JP] | Japan | 1-227930 |

[51] Int. Cl.⁵ ............................................. B65G 65/00
[52] U.S. Cl. ............................... 414/411; 53/284.4; 271/162; 378/174; 414/404
[58] Field of Search .................. 414/403, 404, 411; 53/284.4; 378/172–174; 271/145, 162

[56] References Cited

U.S. PATENT DOCUMENTS

| 3,111,585 | 11/1963 | Sano et al. | 414/411 |
| 4,253,788 | 3/1981 | Oaks et al. | 414/403 |
| 4,354,336 | 10/1982 | Azzaroni | 414/411 X |
| 4,514,958 | 5/1985 | Hoorn | 414/403 X |
| 4,539,794 | 9/1985 | Azzaroni | 414/411 X |
| 4,811,546 | 3/1989 | Takashima et al. | 414/411 X |
| 4,845,734 | 7/1989 | Maki et al. | 378/172 X |
| 4,878,799 | 11/1989 | Seto et al. | 414/411 X |

Primary Examiner—David A. Bucci
Attorney, Agent, or Firm—Sughrue, Mion, Zinn, Macpeak & Seas

[57] ABSTRACT

A cassette loading and unloading device for loading and unloading a cassette which typically accommodates an exposed film carrying image information includes a pair of guides for holding a cassette therebetween, the guides being relatively displaceable depending on the size of the cassette to be held therebetween, a cassette holder for displacing the guides to a position in which to open a lid of the cassette, while the cassette is being held by the guides, and a displacing mechanism for returning the cassette holder to an original position and allowing the cassette to be removed from the guides. The guides include a fixed guide and a movable guide, which are relatively movable to define a space therebetween that matches the size of a selected cassette.

24 Claims, 8 Drawing Sheets

CASSETTE LOADING AND UNLOADING DEVICE

BACKGROUND OF THE INVENTION

The present invention relates to a cassette loading and unloading device for adjustably accommodating cassettes of different sizes which accommodate films or the like of different sizes, for removing the film from a loaded cassette and delivering the film to either a magazine which can store a stack of films or an automatic developing machine, and for automatically unloading a loaded cassette after the film is taken out therefrom.

Heretofore, a film which has been exposed to an X-ray image and which has not yet been developed is accommodated in a cassette in a light-shielding condition, and the cassette is loaded into a given device. After the film is taken out of the cassette and placed in a magazine, the empty cassette is unloaded from the above device, or alternatively the exposed film is fed from the cassette to an automatic photographic processor through a film removal device. Such a device is widely employed in mammographic imaging systems.

The relationship between the device and a mammographic imaging system will be described below with reference to FIG. 1 of the accompanying drawings.

Films a which are stacked in an envelope are placed in a magazine b in a bright room, and the magazine b is then accommodated in a loading device c. An empty flat cassette d is also accommodated in the loading device c. If films a' of a different size are also involved, the films a' are placed in a magazine b' in a bright room, and the magazine b' and an empty cassette d' are accommodated in another loading device c'. In the loading device c, an unexposed film a is transferred from the magazine b into the cassette d by a feed mechanism (not shown). Then, the cassette d which accommodates the film a in a light-shielding condition is taken out of the loading device c. Likewise, an exposed film a' is transferred from the magazine b' into the cassette d' which is taken out of the loading device c'. The films a, a' in the flat cassettes d, d' are used to photograph an object such as a woman's chest to check for a breast cancer, for example.

The cassettes d or d' (referred to as a "cassette f), which places the exposed films therein, is then accommodated in a film removal device g associated with an automatic photographic processor. Alternatively, the cassette f is placed in a film storage device h which is not associated with an automatic developing machine. In the film storage device h, the films are stacked in a magazine i by a film delivery mechanism. Then, the magazine i is accommodated in a film feed device j associated with an automatic photographic processor, and the films are taken out of the magazine i and sent to the automatic photographic processor. The films are thereafter developed into X-ray photographs by the automatic photographic processor.

One conventional film cassette loading and unloading device includes belts and roller groups for delivering a cassette into and out of a film storage device. Such a belt-and-roller arrangement can automatically load and unload cassettes. However, the distances between the belts and the roller groups have to be adjustable in order for the film cassette loading and unloading mechanism to handle cassettes of different sizes. The automatic film cassette loading and unloading device is therefore complex in structure, expensive to manufacture, and cannot be greatly reduced in size.

There has also been proposed a cassette loading and unloading device which receives a manually inserted cassette and delivers the received cassette. The cassette loading and unloading device has a cassette guide which allows an one of a plurality of cassettes to be manually inserted into the film storage device when a lid of the cassette loading and unloading device is opened. Inasmuch as a desired cassette is manually inserted, the insertion process is timeconsuming, laborious, and always requires manual intervention.

When films are to be taken out of cassettes of different sizes, lock means associated with the cassettes for keeping the cassettes shielded from light have to be unlocked individually. To this end, the cassette loading and unloading device must have unlocking means corresponding respectively to the lock means of the cassettes. Since the different cassettes have different longitudinal and transverse dimensions, the cassette loading and unloading device would be quite complex in structure and large in size if respective unlocking means were provided positionally corresponding to the lock means of the different cassettes.

Actually, therefore, a dedicated cassette loading and unloading device is employed with respect to cassettes of one size. If differently sized cassettes are involved, different cassette loading and unloading devices matching those cassette sizes have to be employed.

After the film has been taken out of a cassette in a cassette loading and unloading device, the cassette needs to be unloaded from the cassette loading and unloading device. Before the cassette is unloaded, a lid of the cassette which has been open for the removal of the film therefrom must be closed because it would be cumbersome to unload the cassette with its lid open and the opening for the unloading of the cassette would have to be large enough to allow the passage of the cassette with the open lid.

Some prior devices employ movable suction cups or pads for opening the lid of a cassette before it is unloaded. The cassette lid is sucked by the suction cups under vacuum and angularly displaced into a closed position.

The cassette loading and unloading devices which incorporate such suction cups are structurally complicated as they require a vacuum generator and tubes connecting the vacuum generator to the suction cups. Another problem is that the path of the movable suction cups may be limited by other components positioned near the suction cups.

SUMMARY OF THE INVENTION

It is a principal object of the present invention to provide a cassette loading and unloading device for selectively accommodating a plurality of types of cassettes, for automatically taking out an exposed film from a loaded cassette and either placing the film into a magazine or feeding the film to a photographic processor, and for automatically unloading an empty cassette out of the cassette loading and unloading device.

Another object of the present invention is to provide a cassette loading and unloading device which can selectively accommodate a plurality of types of cassettes through an expandable and contractable guide assembly, can automatically take an exposed film out of the cassette and either place the film into a magazine or feed the film to a photographic processor, and can hold the guide assembly locked when the cassette is loaded, so that the film can be taken out of the cassette stably and reliably.

Still another object of the present invention is to provide a cassette loading and unloading device which limits an angular displacement of a lid of a loaded cassette when it is opened, and which causes a link mechanism to press the lid to a cassette body to lock the lid with respect to the cassette when the cassette is closed, or which allows the cassette to be unloaded out of the device in a flat condition with the lid being left open.

Another object of the present invention is to provide a cassette loading and unloading device comprising a pair of guides for holding a cassette therebetween, the guides being relatively displaceable depending on the size of the cassette to be held therebetween, a cassette holder for displacing the guides to a position in which to open a lid of the cassette, while the cassette is being held by the guides, and displacing means for returning the cassette holder to an original position and allowing the cassette to be removed from the guides.

Still another object of the present invention is to provide the cassette loading and unloading device wherein the guides include a fixed guide and a movable guide, the fixed guide and the movable guide being mounted on the cassette holder.

Yet another object of the present invention is to provide the cassette loading and unloading device further including external operable means, actuatable from outside of the device, for displacing the movable guide with respect to the fixed guide to define a space for receiving the cassette between the fixed guide and the movable guide.

Yet still another object of the present invention is to provide the cassette loading and unloading device wherein the externally operable means comprises a lever extending out of the device and a plate coupled to the lever, the plate being displaceable with respect to the cassette holder and supporting the movable guide.

A further object of the present invention is to provide the cassette loading and unloading device further including a roller rotatably mounted on the plate, the cassette holder including a plate on which the roller is rollingly mounted.

A still further object of the present invention is to provide the cassette loading and unloading device further including lock means for locking the guides against displacement with respect to the cassette holder in response to insertion of the cassette between the guides.

A yet further object of the present invention is to provide the cassette loading and unloading device wherein the cassette holder has a hole, the lock means comprising a locking finger mounted on the movable guide, the locking finger being angularly movable into the hoe in response to insertion of the cassette between the guides.

A yet still further object of the present invention is to provide the cassette loading and unloading device further including cassette displacement limiting means for limiting the position of the cassette between the guides in a direction in which the cassette is inserted between the guides.

It is also an object of the present invention to provide the cassette loading and unloading device further including a plate displaceable with the guides, the cassette displacement limiting means comprising a first engaging member mounted on the cassette holder and a second engaging member mounted on the plate, the first and second engaging members being engageable with each other to limit the position of the cassette upon relative displacement of the guides.

Another object of the present invention is to provide the cassette loading and unloading device wherein the first engaging member comprises a plate having a bent portion and the second engaging member comprises a collar which is positionable in the bent portion to limit the position of the cassette.

Still another object of the present invention is to provide the cassette loading and unloading device wherein the cassette has a lock mechanism for locking the lid thereof, further including unlocking means for releasing the lock mechanism of the cassette which is held by the guides, thereby to unlock the lid of the cassette.

Yet another object of the present invention is to provide the cassette loading and unloading device wherein the unlocking means comprises an unlocking bar for engaging a trailing end of the cassette and an unlocking pin for engaging a leading end of the cassette.

Yet still another object of the present invention is to provide the cassette mounting and discharging mechanism further including first moving means for displacing the lock mechanism of the cassette held by the guides toward the unlocking means, and second moving means for displacing the unlocking means depending on the size of the cassette.

Yet still another object of the present invention is to provide the cassette loading and unloading device wherein the guides include a fixed guide and a movable guide, the second moving means comprising a plate displaceable with the movable guide.

A further object of the present invention is to provide the cassette loading and unloading device wherein the first moving means comprises a rotative drive source, a drive fork engaging the cassette holder, and rotative power transmitting means for transmitting rotative power of the rotative drive source to the drive fork.

A still further object of the present invention is to provide the cassette loading and unloading device further including an actuator displaceable in response to insertion of the cassette between the guides, and a sensor energizable in response to displacement of the actuator, for producing an output signal to energize the rotative drive source.

A yet further object of the present invention is to provide the cassette loading and unloading device further including a rotative drive source, an arm supporting the unlocking bar, rotative power transmitting means for transmitting rotative power from the rotative drive source to the arm, and moving means on the rotative power transmitting means, for displacing the unlocking bar in unison with the arm to move the cassette to a position in which to unlock the lid of the cassette.

Another object of the present invention is to provide the cassette loading and unloading device further including lid closing means for closing again the lid of the cassette which has been unlocked and opened.

Still another object of the present invention is to provide the cassette loading and unloading device wherein the lid closing means comprises a rotative drive source, a link rotatable by the rotative drive source and pressable against the lid of the cassette, and rotative power transmitting means for transmitting rotative power from the rotative drive source to the link to rotate the link into pressing engagement with the lid, thereby forcibly closing the lid.

Yet another object of the present invention is to provide the cassette loading and unloading device further including means responsive to rotation of the rotative drive source for displacing the unlocking bar to move the cassette to a position in which to unlock the lid of the cassette.

Yet still another object of the present invention is to provide the cassette loading and unloading device further including a roller mounted on an end of the link and engaging the lid of the cassette.

Still another object of the present invention is to provide the cassette loading and unloading device wherein the displacing means comprises a drive source, swingable holding means for holding the cassette holder, and power transmitting means for transmitting power from the drive source to the holding means to swing the holding means to return the cassette holder to the original position thereof.

Yet another object of the present invention is to provide the cassette loading and unloading device wherein the displacing means further includes a guide member for guiding displacement of the cassette holder, the holding means comprising a drive fork engaging the cassette holder, the drive source comprising a rotative drive source for angularly moving the drive fork through the power transmitting means to return the cassette holder to the original position along the guide member.

Still another object of the present invention is to provide the cassette loading and unloading device wherein the guide member has a guide groove defined therein, the cassette holder having a pin movably fitted in the guide groove, the fork member engaging the pin.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
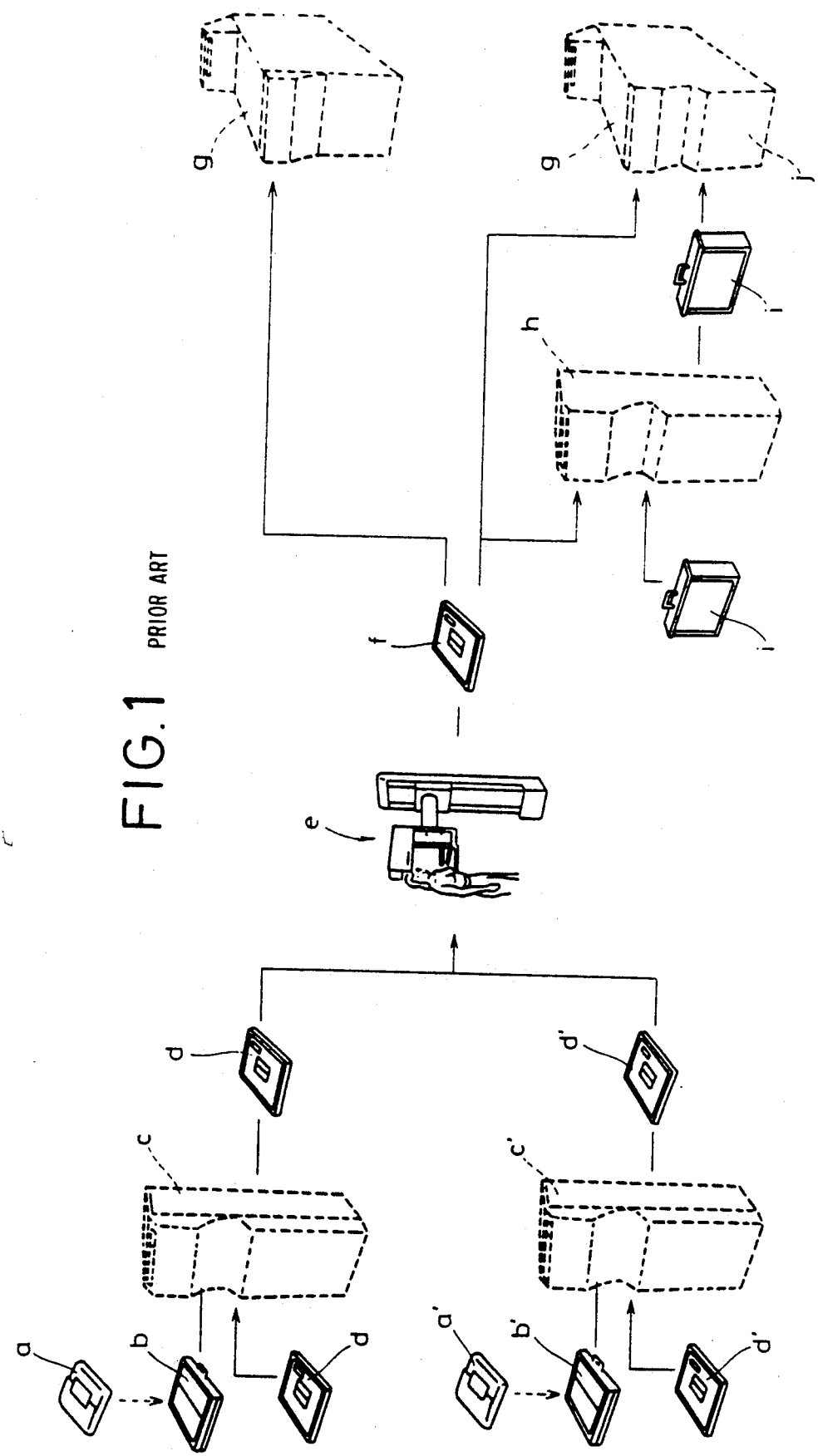
FIG. 1 is a diagram of a mammographic imaging system as a background of the present invention.
Figure 2:
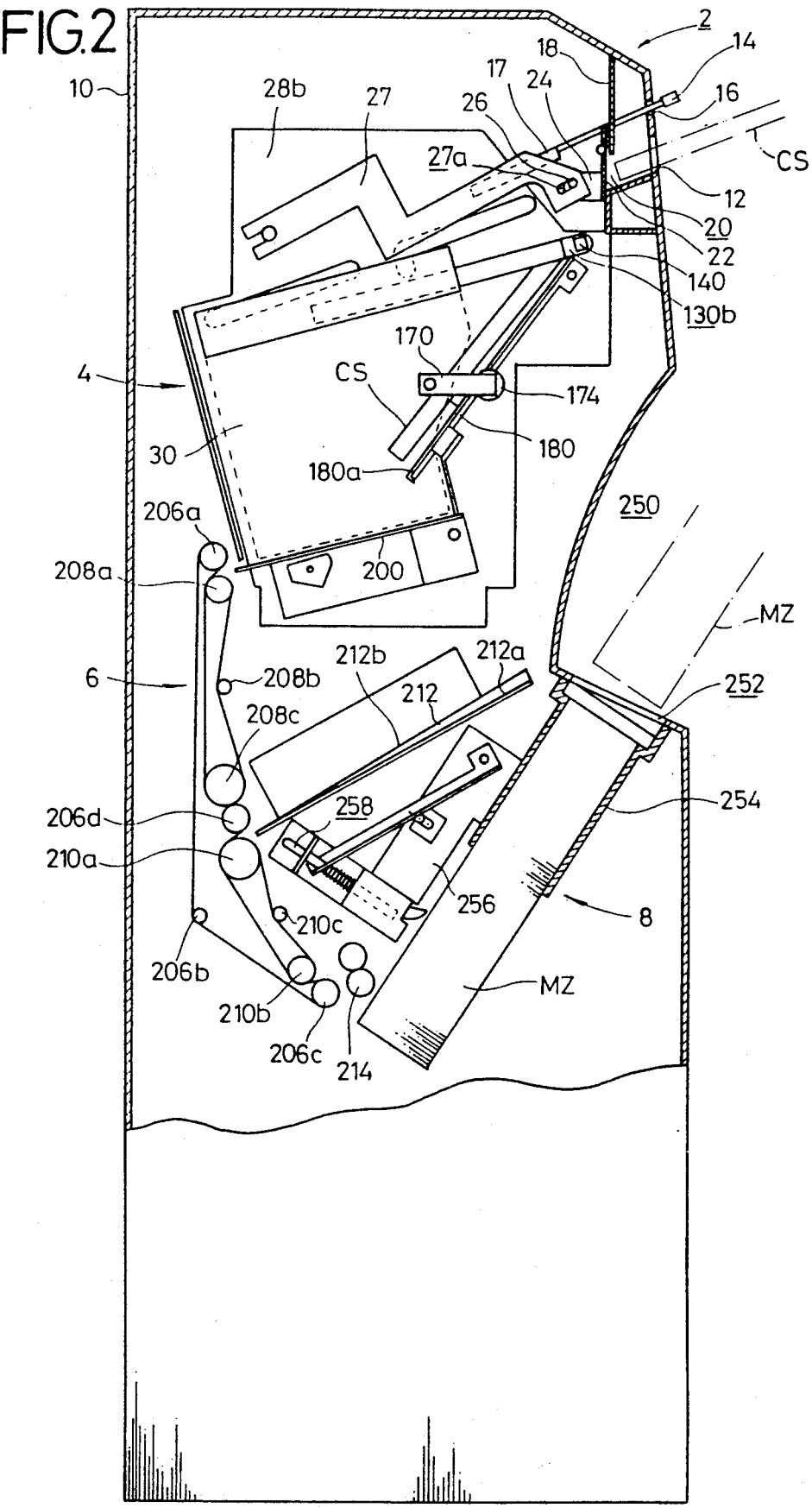
FIG. 2 is a schematic vertical cross-sectional view of a film storage device incorporating a cassette loading and unloading device according to the present invention.

FIG. 2 shows a device 2 such as a film storage device which incorporates a film cassette loading and unloading device according to the present invention. The film storage device 2 includes, in addition to the film cassette loading and unloading device 4, a feed system 6 for feeding an exposed film from the film cassette loading and unloading device 4, and a magazine loading device B for inserting a magazine which stores stacked films fed one by one by the feed system 6.

First, the film cassette loading and unloading device 4 will be described below. The film cassette loading and unloading device 4 includes a vertically long housing 10 which has an opening 12 defined in an upper side wall thereof for inserting a cassette CS therethrough and a narrower opening 16 defined in the upper side wall immediately above the opening 12, the opening 16 receiving a displaceable lever 14 extending therethrough which lever 14 can be manipulated from outside of the housing 10. The lever 14 has an inner distal end to which there is connected a channel-shaped displaceable member 17 which is open downwardly. A vertical plate 18 extends downwardly from the upper side wall of the housing 10 closely to the opening 12. The plate 18 defines an opening 20 that can be opened and closed by a shutter 22 which is joined to a bracket 24 having a projecting pin 26. The pin 26 is disposed in a hole 27a defined in one end of a shutter opening arm 27 of a bent configuration which is angularly movably supported on a side plate 28b (described below).

Figure 3:
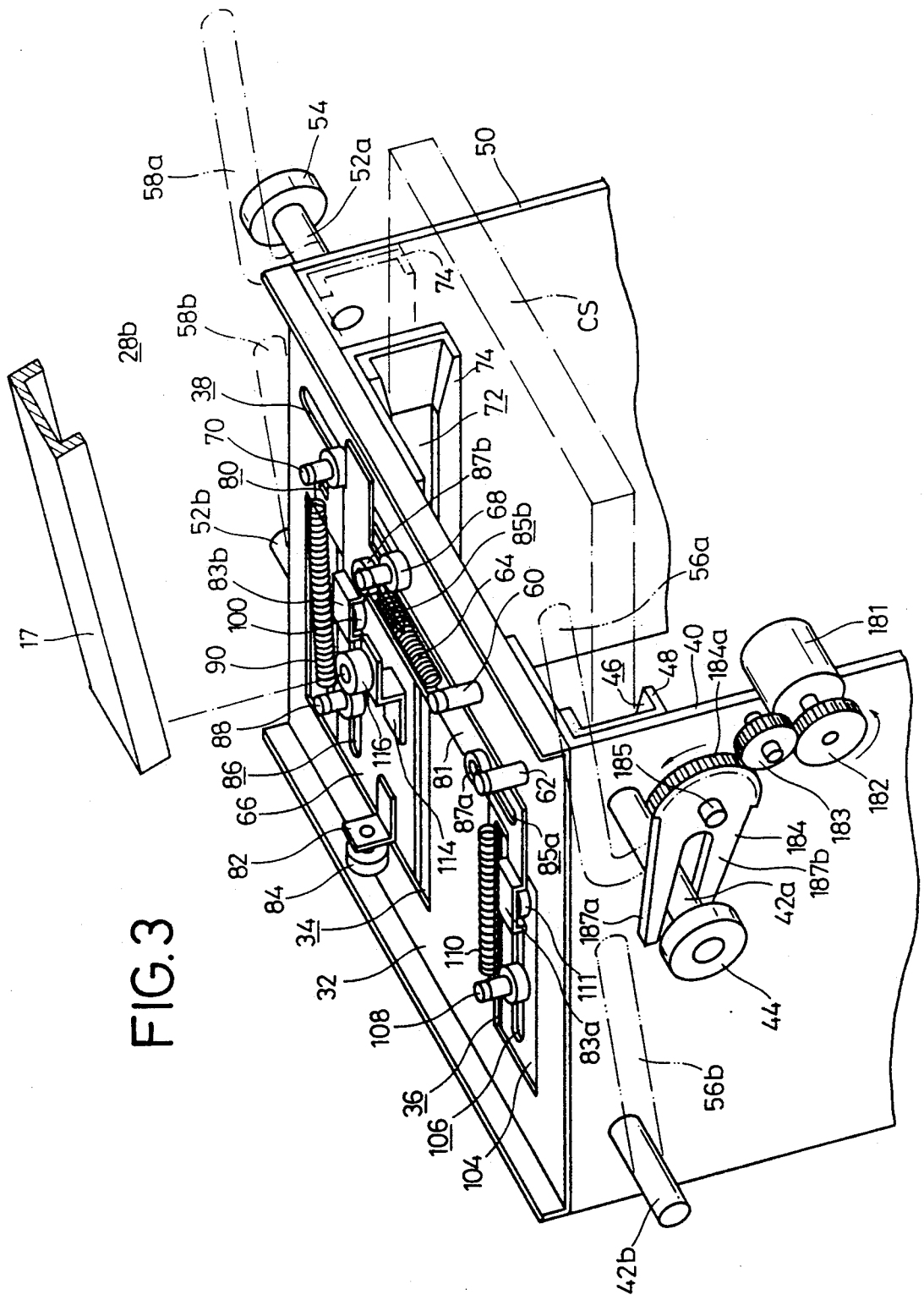
FIG. 3 is a fragmentary perspective view of a cassette holder in the film storage device.

A pair of vertical side pates 28a, 28b (only one of which is down) is disposed in an upper portion of the housing 10, and a cassette holder 30 is positioned between the side plates 28b. As shown in FIG. 3, the cassette holder 30 includes a plate 32 having opposite ends bent upwardly and also having large openings 34, 36 defined therein, the openings 34, 36 being spaced from each other. The plate 32 also has a slot 38 defined in a longitudinal end thereof near the opening 34. An attachment member 40 of a bent configuration is joined to one side of the plate 32, and two pins 42a, 42b which are spaced from each other are mounted on opposite ends of the attachment member 40, the pins 42a, 42b projecting outwardly. A roller 44 is mounted on the outer end of the pin 42a. A fixed channel-shaped guide 48 is secured to an inner surface of the attachment member 40. The guide 48 has a guide groove 46 defined therein.

Another attachment member 50 is secured to the opposite side of the plate 32 remotely from the attachment member 40. The attachment member 50 supports two pins 52a, 52b aligned with the pins 42a, 42b, respectively, and projecting outwardly. A roller 54 is mounted on the outer end of the pin 52a. The pins 42a, 42b engage in a curved slot 56a and a straight slot 56b, respectively, the slots 56a, 56b being defined in the side plate 28a, and the pins 52a, 52b engage in a curved slot 58a and a straight slot 58b, respectively, the slots 58a, 58b being defined in the side plate 28b.

A pin 60 projects upwardly from the upper surface of the plate 32, and another pin 62 also projects upwardly from the upper surface of the plate 32 near the pin 60. One end of a coil spring 64 is connected to the pin 60, and the other end of the coil spring 64 is connected to a pin 68 which projects upwardly from a plate 66 beneath the plate 32 through the slot 38. The plate 66 also supports another pin 70 projecting upwardly through the slot 38 and spaced from the pin 68.

The plate 66 includes a downwardly bent portion to which there is fixed a movable guide 74 having a guide groove 72. The movable guide 74 supports a pin 76 (FIG. 4) projecting from an upper portion of one end thereof, and a locking finger 78 is pivotally mounted on the pin 76. When a cassette is inserted between the fixed guide 48 and the movable guide 74 through the guide grooves 46, 72, an end of the cassette near the guide groove 72 turns the locking finger 78 upwardly. A distal end of the locking finger 78 thus turned extends through a hole (not shown) defined in the plate 66 and engages in a locking hole 80 which is defined in the plate 32. Therefore, the movable guide 74 is locked by the locking finger 78 against movement in the longitudinal direction thereof in FIG. 3.

An angle 82 having one end projecting upwardly is mounted on the plate 66 and supports a rotatable roller 84 which can roll on the plate 32. The plate 66 has a slot 86 defined therein in the longitudinal direction thereof, i.e., perpendicularly to the slot 38 A pin 88 extends upwardly through the slot 86 and has an upper end engaged by one end of a coil spring 90, whose other end is connected to the pin 70.

A cassette displacement limiting member 81 is mounted on the plate 32 near the pins 60, 68. The cassette displacement limiting member 81 has two bent portions 83a, 83b on respective bent opposite ends thereof, the bent portions 83a, 83b defining downwardly open spaces. The cassette displacement limiting member 81 also has two slots 85a, 85b defined therein in the longitudinal direction thereof. Cylindrical collars 87a, 87b have respective shafts extending downwardly through the slots 85a, 85b, respectively.

Figure 4:
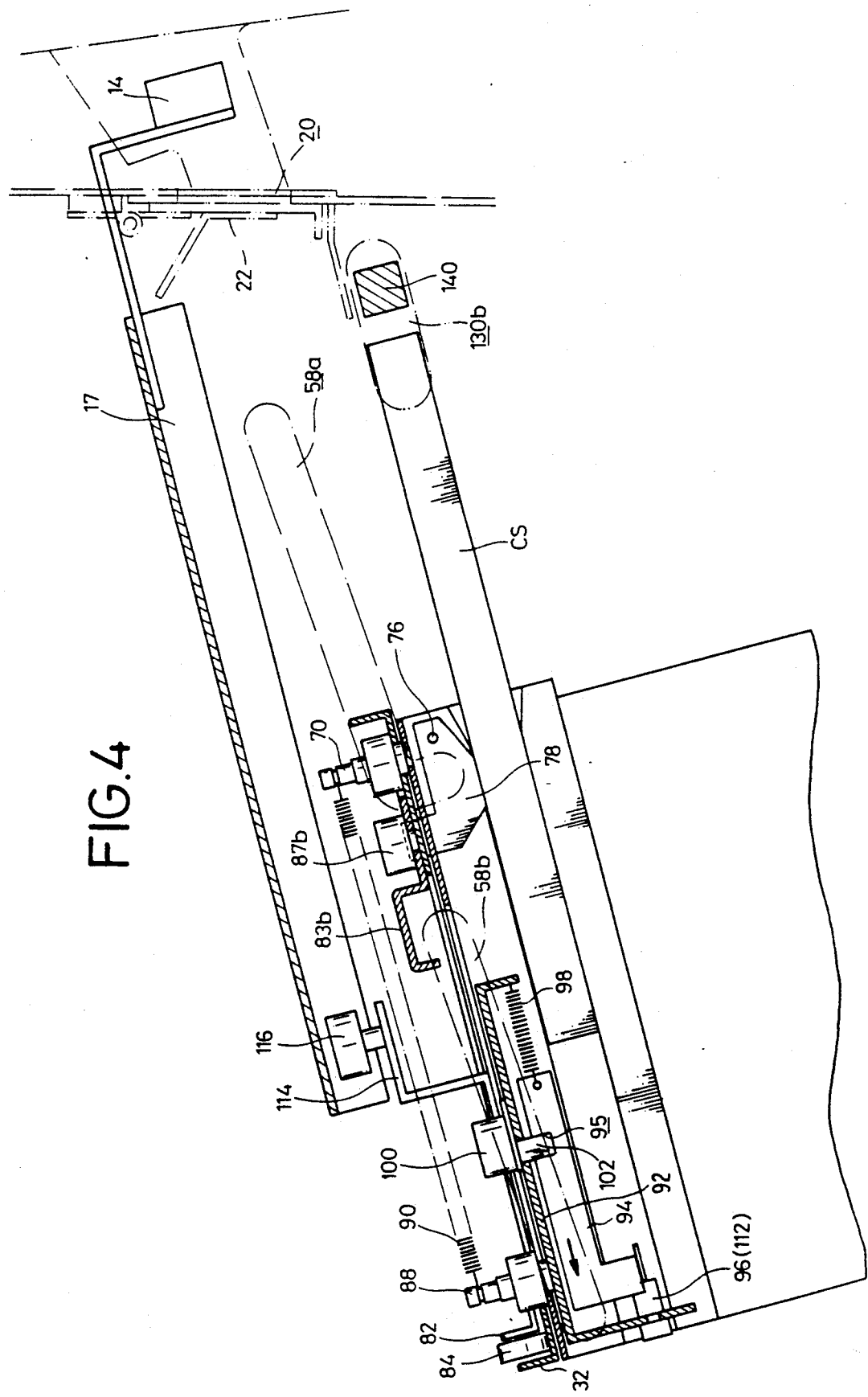
FIG. 4 is a vertical cross-sectional view of the cassette holder.

As shown in FIG. 4, the pin 88 extends downwardly from the slot 86 and has a lower end coupled to a plate 92 which has a downwardly bent portion. The plate 82 serves to hold a sensor actuator 94 and an unlocking pin 96. The sensor actuator 94 has a recess 95 defined in an upper longitudinal edge thereof between opposite ends thereof, with one of the ends being engaged by one end of a coil spring 98. The other end of the coil spring 98 is connected to one end of the plate 92.

A sensor 102 in the form of a photointerrupter is mounted on the plate 66. A collar 100 for engaging the cassette displacement limiting member 81 projects upwardly from the slot 86.

As shown in FIG. 3, a plate 104 is positioned beneath the opening 36 and has a slot 106 through which a pin 108 projects, the pin 108 being identical to the pin 88. A coil spring 110 extends between the pins 108, 62. Although not shown, the pin 108 holds a plate which is the same as the plate 92, and the plate supports a collar 111 and an unlocking pin 112. The collar 111 and the unlocking pin 112 are identical to the collar 100 and the unlocking pin 96, respectively.

A bent member 114 is fixedly mounted on the plate 66 in spaced-apart relation to the angle 82. A roller 116 is rotatably mounted on an upper distal end of the bent member 114.

Figure 5:
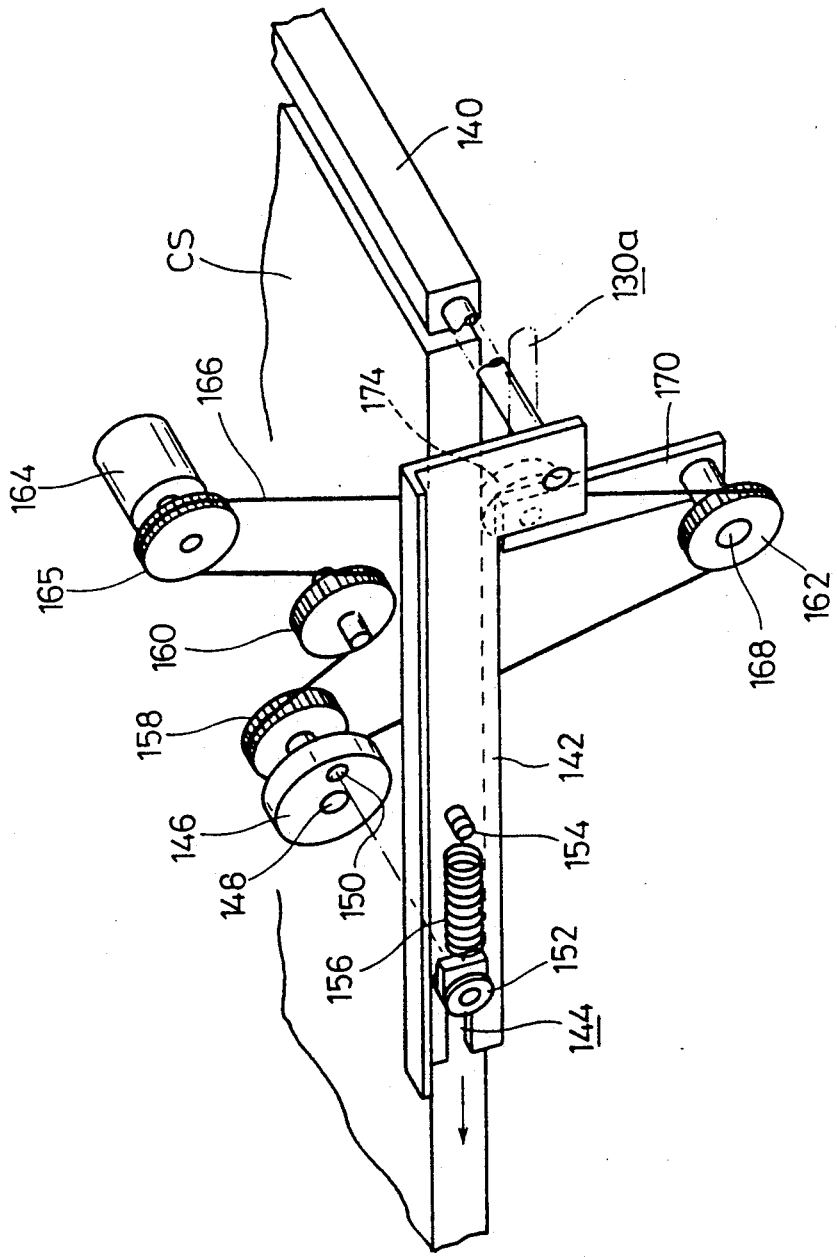
FIG. 5 is a perspective view of an unlocking mechanism in the film storage device.

The side plates 28b will be described below in more detail. The side plates 28b have relatively short, inclined slots 130a, 130b (see FIGS. 2, 4, and 5) defined therein below the slots 56a, 58a. An unlocking bar 140 extends between and through the slots 130a, 130b. One end of an arm 142 is pivotally supported on the unlocking bar 140, the arm 142 having a long groove 144 defined longitudinally in its opposite end (see FIG. 5). The long groove 144 is positioned near an unlocking link 146 which has a pin 150 displaced off center from a shaft 148 thereof. The pin 150 supports on its end a roller 152 which is normally biased toward the bar 140 by a tension spring 156, one end of which engages a pin 154 mounted on the arm 142 The link 146 has a coaxial sprocket 158 positioned near an idler sprocket 160. A sprocket 162 is disposed below the arm 142. An endless chain 166 is trained around a sprocket 165 mounted on he rotatable drive shaft of a motor 164, the sprocket 162, the sprocket 158, and the idler sprocket 160. The sprocket 162 has a shaft 168 on which there is pivotally supported a link 170 with a roller 174 rotatably mounted thereon. When the motor 164 is energized, the sprocket 165 is rotated to cause the chain 166 to rotate the sprocket 158, the sprocket 168, and the idler sprocket 160.

As shown in FIG. 2, the roller 174 engages a flange 180a extending outwardly from a plate 180 for closing the lid of the cassette CS, the plate 180 being pivotally supported at one end thereof near and below the unlocking tar 140. Therefore, when the link 170 rotates, the lid closing plate 180 is angularly moved by the roller 174.

A motor 181 (FIG. 3) is disposed near the side plate and has a rotatable drive shaft supporting a gear 182 which meshes with a gear 183. The gear 183 is held in mesh with teeth 184a on a semicircular edge of a drive fork 184. The drive fork 184 is supported on a shaft 185 which extends toward the side plate 28b and supports another drive fork (not shown) on its opposite end. The drive fork 184 has two fingers 187a, 187b sandwiching the pin 42a, and the other drive fork has two fingers (not shown) sandwiching the pin 52a.

Figure 6:
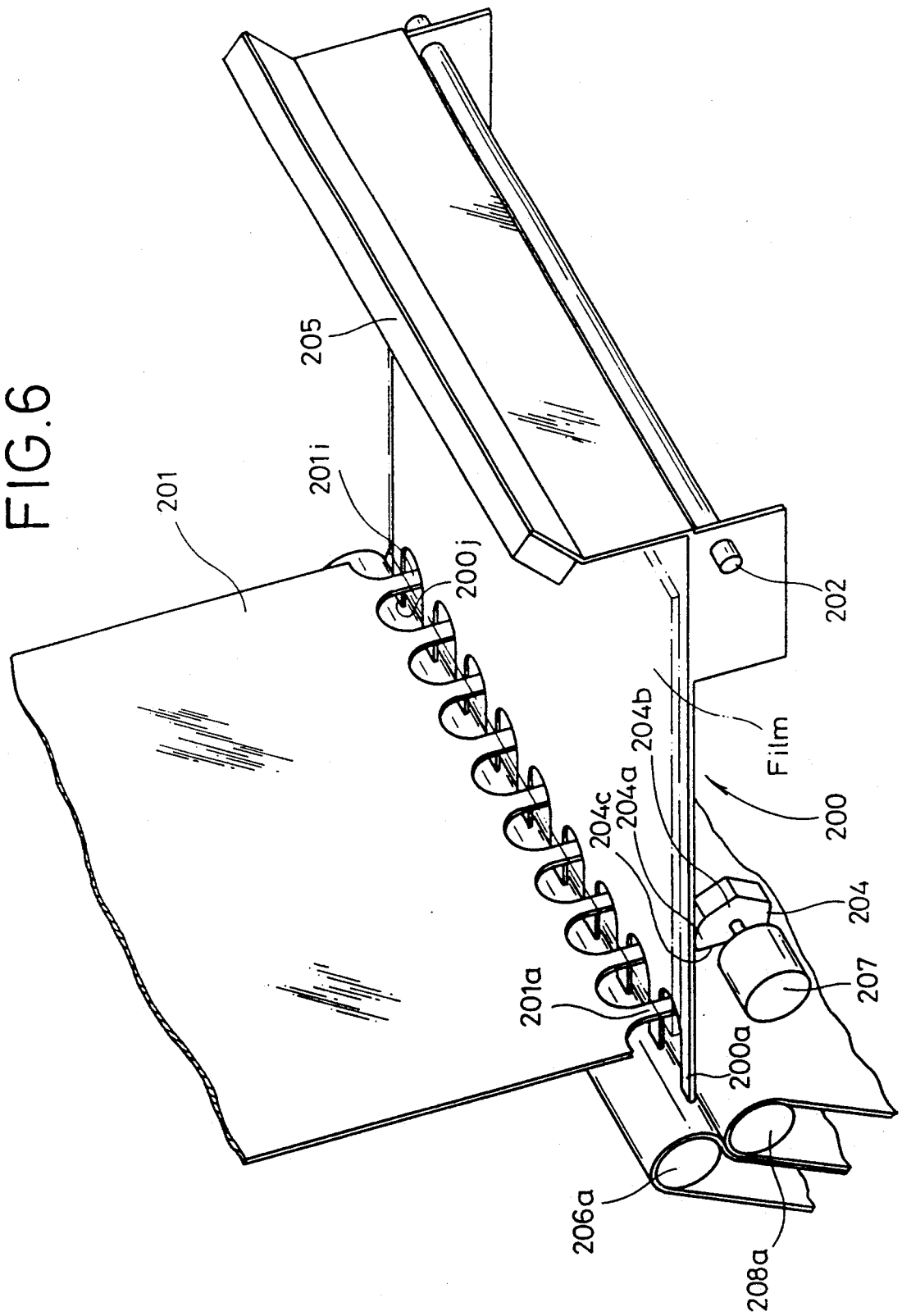
FIG. 6 is a perspective view of a film guide plate in the film storage device.

The lid closing plate 180 serves to guide a film taken out of a cassette CS when the lid closing plate 180 is in an open position. When the lid closing plate 180 is in the open position, the distal end of the lid closing plate 180 is directed toward a swingable guide 200. As shown in FIG. 6, the guide 200 has a plurality of teeth 200a through 200j on its distal end which are held in mesh with teeth 201a through 201j on the distal end of a plate 201. The other end of the guide 200 is pivotally supported on a shaft 202. The guide member 200 has an upturned portion extending from the other end thereof remote from the teeth 200a through 200j and supporting thereon a receiver pad 205 for the lid closing plate 180. The guide 200 has a lower surface engaged by a rotor 204 of a deformed pentagonal shape near the toothed end, the rotor 204 being rotatable by a motor 207. The rotor 204 has a curved portion 204a, an angular portion 204b, and a flat portion 204c. When the rotor 204 rotates, the curved portion 204a and the angular portion 204b engage the lower surface of the guide 200 smoothly and joltingly. As the curved portion 204a and the angular portion 204b of the rotor 204 successively engage the guide 200, the toothed end of the guide 200 is gradually and abruptly displaced, thereby aligning a dropping film in coaction with the plate 201. When the flat portion 204c engages the guide 200, the guide 200 descends to release the teeth 200a through 200j out of mesh with the teeth 201a through 201j, allowing the film to drop off the guide 200.

The toothed end of the guide 200 is positioned closely to the feed system 6 As shown in FIG. 2, the feed system 6 comprises a first group of rollers 206a, 206b, 206c, 206d, a second group of rollers 208a, 208b, 208c, a third group of rollers 210a, 210b, 210c, and endless belts trained around the first, second, and third roller groups, respectively. A guide 212 which is directed obliquely upwardly is positioned near the roller 206d. The guide 212 has a distal end directed toward the region where the rollers 210a, 206d rollingly contact each other. A roller pair 214 is located near the rollers 206c, 210b, and confronts the magazine mounting mechanism 8. The guide 212 comprises a flat portion 212a and an inclined portion 212b. The flat portion 212a serves to guide a film of narrower size, and the flat portion 212a and the inclined portion 212b jointly serve to guide a film of wider size. The guide 212 includes a raised portion which defines the inclined portion 212b, the raised portion serving to guide an end of a film of narrower size.

Figure 7:
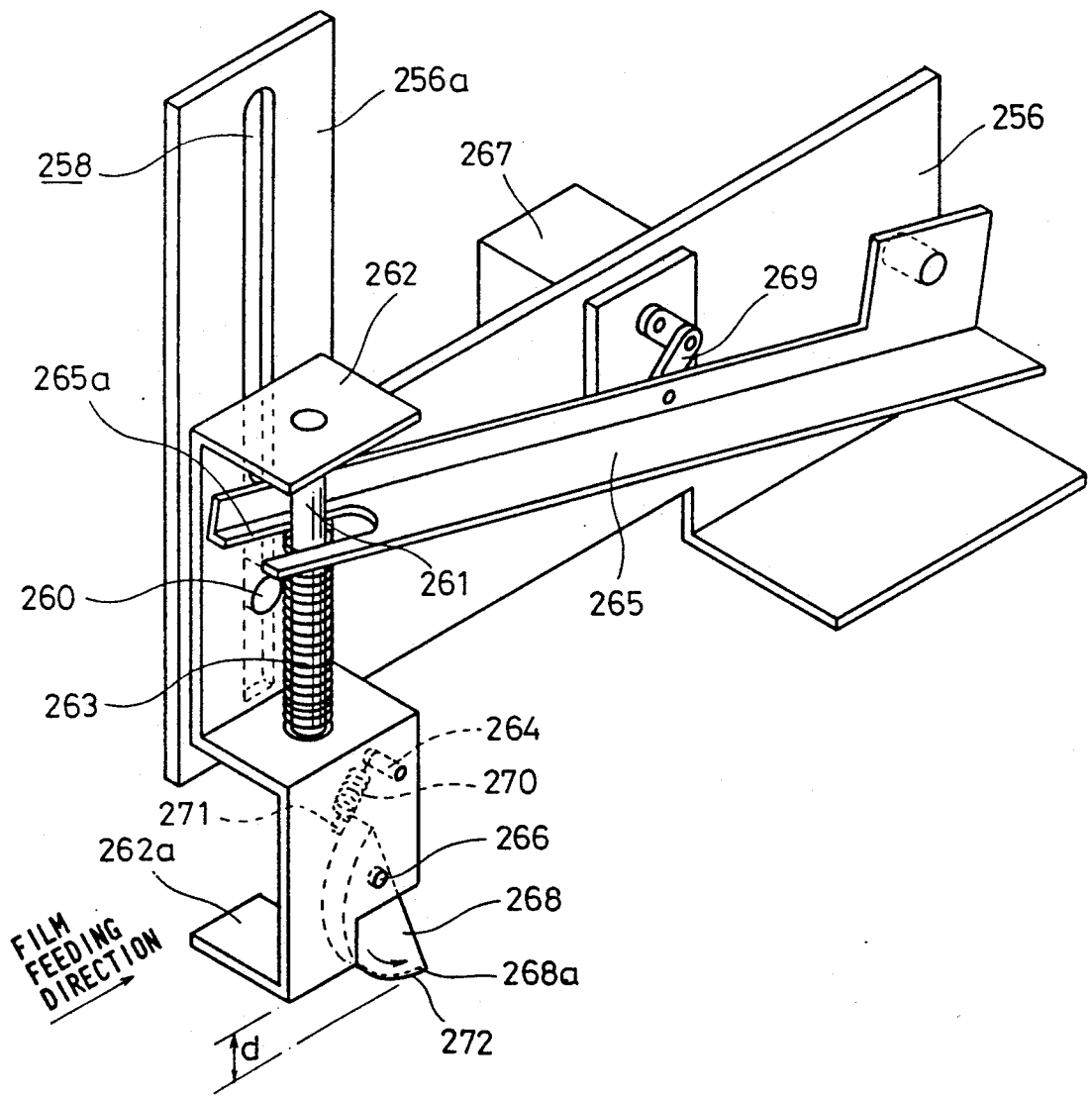
FIG. 7 is a perspective view of a magazine loading device in the film storage device.

The magazine loading device 8 is arranged to load a magazine MZ by utilizing a recess 250 defined in one side of the housing 10. The housing 10 has an opening 252 defined in the bottom of the recess 250, and a magazine holder casing 254 is obliquely disposed in the housing 10 and extending inwardly from the opening 252. A bent support plate 256 is mounted on an upper panel of the magazine holder casing 254 and includes a vertical portion 256a (FIG. 7) which has a slot 258 defined therein perpendicularly to the direction in which the magazine is inserted into the magazine holder casing 254. The slot 258 receives a roller 260 which is joined to a belt lever 262 having two bent portions between which a vertical guide rod 261 extends. A coil spring 263 is disposed around the guide rod 261 and has one end engaged by a swingable member 265 which has an U-shaped groove 265a defined in one end thereof and receiving the guide rod 261. The swingable member 265 is swingable about a pivoted end thereof remote from the groove 265a by a link mechanism 269 coupled to a motor 267. On the lever 262, there are also mounted a pin 264 near one of the two bent portions thereof and another pin 266 disposed below the pin 264.

A semicircular film feeder 268 is pivotally supported on the pin 266 and has one end engaged by one end of a coil spring 270 through a pin 271, the other end of the coil spring 270 being connected to the pin 264. The semicircular film feeder 268 has a frictional layer 272 of synthetic rubber or the like mounted on the curved surface thereof. The film feeder 268 is normally urged to turn downwardly about the pin 266 under the bias of the coil spring 270. The distal end of the semicircular film feeder 268, which is remote from the end engaged by the coil spring 270, is normally spaced downwardly from a bent end 262a of the lever 262 by a distance d.

The film storage device 2 incorporating the film cassette mounting and discharging mechanism 4 according to the present invention s basically constructed as described above. Operation and advantages of the film storage device 2 will hereinafter be described.

A process of loading cassettes CS of different longitudinal and transverse sizes in the device 2 and automatically discharging the cassettes CS from the device 2 will first be described below. When a cassette CS of a larger size is to be introduced into the device 2, the lever 14 is laterally displaced to form a space in the housing 10 which matches the size of the cassette CS. More specifically, the displacement of the lever 14 is transmitted to the channelshaped displaceable member 17. Since the displaceable member 17 engages the roller 116, the plate 66 is displaced and so is the movable guide 74, thus obtaining a desired space for the insertion of the cassette CS therein. At this time, the roller 84 supported on the angle 82 rolls on the plate The bent portions 83a, 83b of the cassette displacement limiting member 83 are displaced out of engagement with the collars 100, 111, respectively. A distal end of the cassette displacement limiting member 83 laterally displaces the pin 70, which then moves in and along the slot 38 together with the pin 68. Therefore, the movable guide 74 is positioned with respect to the fixed guide 48 by the lever 14, so that the cassette CS with an exposed film loaded therein can be brought into the guide groove 46 of the fixed guide 48 and the guide groove 72 of the movable guide 74. If the distance between the fixed and movable guides 48, 74 is already adjusted to the cassette CS to be inserted, then it is not necessary to displace the lever 14.

The cassette CS of a larger size is now inserted through the opening 12 into the housing 10. The leading end of the cassette CS pushes the shutter 22 upwardly, and the shutter opening arm 27 is slightly displaced upwardly by the pin 26 mounted on the bracket 24. The cassette CS can then be inserted into the guide groove 46 of the fixed guide 48 and the guide groove 72 of the movable guide 74. At this time, the locking finger 78 is pushed upwardly by the leading end of the cassette CS. After the movable guide 74 has been displaced, since the plate 32 does not have a hole for receiving the locking finger 78 which is thus displaced, the movable guide 74 is not locked with respect to the cassette CS of this size. Particularly, the movable guide 74 is not required to be locked because it is limited against displacement by the attachment member 50. Further insertion of the cassette CS causes the leading end thereof to press the distal end of the sensor actuator 94. The sensor actuator 94 is therefor displaced in the direction indicated by the arrow in FIG. 4 against the tension of the coil spring 98. After the recess 95 of the sensor actuator 94 has moved past the sensor 102 by being pushed by the cassette CS, a predetermined portion of the sensor actuator 94 blocks passage of light toward the sensor 102 which comprises a photointerrupter.

The sensor 102 now produces an output signal which is sent to the motor 181 fixed to the side plate. When the motor 181 is energized, the gear 182 coupled to the rotatable drive shaft of the motor 181 is rotated in the direction indicated by the arrow, causing the gear 183 to turn the drive fork 184. The rotative power applied to the drive fork 184 is transmitted through the shaft 185 to the drive fork (not shown) on the side of the attachment member 50. The fingers 187a, 187b of the drive forks 184 now forcibly displace the cassette holder 30, which includes the attachment members 40, 50, downwardly of the slots 56a, 56b. Therefore, the cassette CS gripped by the fixed and movable guides 48, 74 is also displaced downwardly. At this time, the pins 42b, 52b are displaced only linearly in and along the slots 56b, 58b, respectively.

The cassette holder 30, which has been displaced downwardly toward the curved ends of the slots 56a, 58a by the drive forks 184, is detected by a sensor (not shown), which produces a drive signal to energize the motor 164. The motor 164 then rotates the sprocket 165, which causes the chain 166 to rotate the sprockets 162, 158, 160 and also the link 146 which is coaxially coupled to the sprocket 158. Therefore, the eccentric pin 150 on the ink 146 is rotated about the shaft 148, angularly displacing the arm 142 about the end of the unlocking bar 140 and also displacing the arm 142 in a direction toward the open end of the long groove 144.

At this time, the roller 152 rotatably supported on the pin 150 pulls the tension spring 156, and the arm 142 is displaced in the direction indicated by the arrow. The unlocking bar 140 supported in the slots 130a, 130b is displaced in unison with the arm 142, enabling the arm 142 to press the trailing end of the cassette CS thereby to hold the cassette CS securely.

Figure 8:
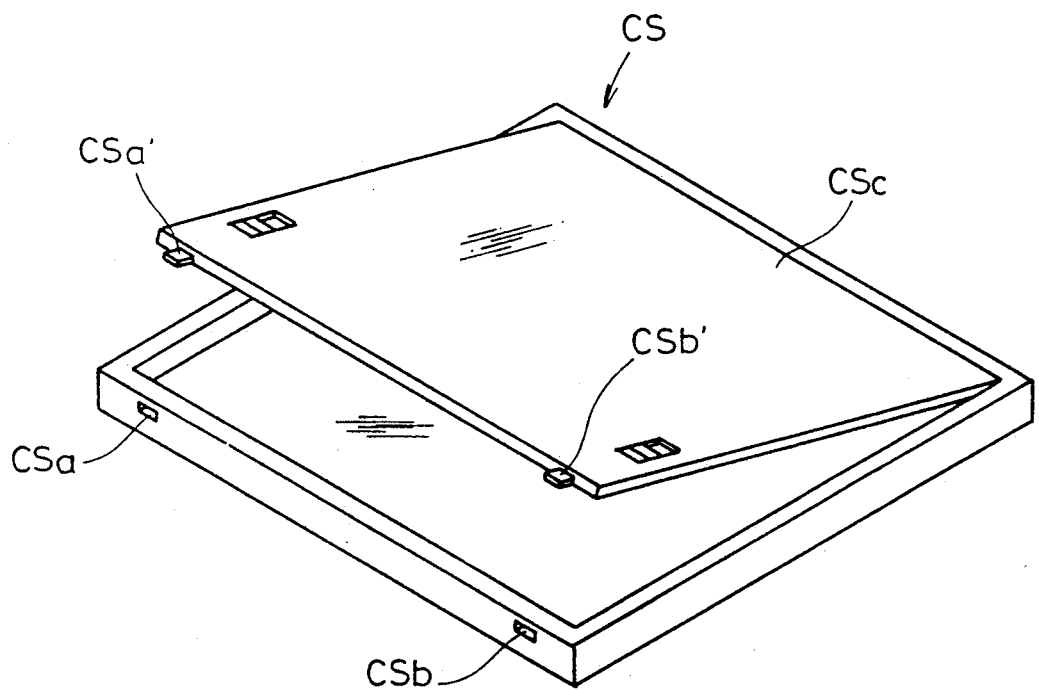
FIG. 8 is a perspective view of a cassette.

The unlocking pins 96, 112 are inserted respectively in through holes CSa, CSb (FIG. 8) defined in a body of the cassette CS, pushing locking members CSa', CSb' in a lid CSc of the cassette CS. Now, the cassette CS is unlocked. Since the link 170 for lifting the lid CSc of the cassette CS, which link 170 is pivotally coupled to the shaft 168 of the sprocket 162, is displaced downwardly, at this time, the lid closing plate 180 held against the roller 174 is angularly moved downwardly about one end thereof. As a result, the lid CSc of the cassette CS is tilted through the same angle as the angle through which the lid closing plate 180 is tilted, thereby opening the cassette CS. Accordingly, the film in the cassette CS drops due to gravity toward the guide 200. The downward displacement of the lid closing plate 180 is limited by the receiver pad 205 on the guide 200.

The film which has dropped from the lid closing plate 180 reaches the upper surface of the guide 200, and has its leading end abutting against the plate 201 whose teeth 201a through 201j mesh with the teeth 200a through 200j of the guide 200. At this time, the rotor 204 supported on the rotatable shaft of the motor 207 has a portion remotest from its center, i.e., the curved portion 204a, held in abutment against the lower surface of the guide 200. The motor 207 is energized to rotate the rotor 204 so that the curved portion 204a and then the angular portion 204b are successively brought into contact with the guide 200. When the flat portion 204c of the rotor 204 then contacts the lower surface of the guide 200, the guide 200 reaches its lowermost position. Now, the guide 200 and the distal end of the plate 201 are slightly spaced from each other. The rotor 204 thus imparts a vibratory action to the guide 200, so that the film on the guide 200 has its leading end positioned with respect to the plate 201 (see FIG. 6).

Then, the feed system 6 is actuated. The film is gripped and fed toward the guide 212 by the belt around the first group of rollers 206a through 206d and the belt around the second group of rollers 208a through 208c. Since the guide 212 has a step between the flat portion 212a and the inclined portion 212b, the film which is of a larger size is placed on the guide 212 over the step. If the film is of a smaller size, the film is placed on the flat portion 212b below the step.

It should be noted that the film is placed upside down on the guide 212. The film is then removed from the guide 212, gripped between the belt around the first group of rollers 206a through 206d and the belt around the third roller pair 214. At this time, a magazine MZ has already been inserted in the magazine holder casing 254, and an opening defined in a lower portion of the magazine MZ is large enough to receive the film.

The motor 267 is energized to lower the swingable member 265 (FIG. 7) through the link mechanism 269, whereupon the roller 260 riding in the slot 258 in the support plate 256 is displaced downwardly, so that the film which is fed from the feed system 6 is engaged by the curved edge of the film feeder 268. Upon continued energization of the motor 267, the roller 260 is displaced downwardly against the resiliency of the coil spring 263, forcing the film into abutment against the bottom panel of the magazine MZ or a stack of films already stored in the magazine MZ. Inasmuch as one end of the film feeder 268 is pulled by the coil spring 270, when the film feeder 268 abuts against the film upon downward displacement of the lever 262, the film feeder 268 is resiliently turned about the pin 266 in the direction indicated by the arrow. Therefore, reactive forces generated and applied to the film feeder 268 in response to forces imposed to the film by the film feeder 268 displace the film feeder 268 in the direction indicated by the arrow against the bias of the coil spring 270. The distal end 268a of the film feeder 268 is thus displaced in a direction to feed the film upwardly into the magazine MZ. The film is now pushed into the magazine MZ by the film feeder 268 and the end 262a of the lever 262 (see FIG. 7).

The above process is repeated to accommodate a stack of exposed films in the magazine MZ. After a desired number of films have been stacked in the magazine MZ, the magazine MZ is removed from the opening 252 in a light-shielding condition.

After the film has been taken out of the cassette CS, the cassette CS itself has to be discharged from the housing 10. The cassette CS is automatically discharged from the housing 10. More specifically, when the film is taken out of the cassette CS and fed toward the guide 200, the motor 164 is energized again. The link 170 is angularly moved to cause the roller 174 on the distal end thereof to angularly displace the flange 180a of the lid closing plate 180 upwardly, until the lid closing plate 180 pushes the lid CSc into the cassette CS. At this time, the sprockets 162, 158, 160 are also rotated by the chain 166, so that the roller 152 returns to its original position. The tension spring 156 is contracted, and the arm 142 is displaced back to its original position. The displacement of the arm 142 allows the unlocking bar 140 to return toward its original position within the range defined by the slots 130a, 130b. Therefore, the trailing end of the cassette CS which has been securely held so far by the unlocking bar 142 is now released and becomes displaceable.

The motor 181 is then reversed to cause the gears 182, 183 to angularly move the drive forks 184 backwards. Therefore, the cassette holder 30 is displaced along the slots 56a, 58a and 56b, 58b through the pins 42a, 52a and the pins 42, 52b, toward the opening 12. The rollers 44, 54 mounted on the pins 42a, 52a push the bent portion of the shutter opening member 27 upwardly, which is angularly displaced upwardly about its pivoted end. The pin 26 which engages the distal end of the shutter opening member 27 now causes the bracket 24 to open the shutter 22. The drive forks 284 are turned to fur&her displace the cassette holder 30 toward the opening 12 along the sots 56a, 58a and 56b, 58b, whereupon the cassette CS held by the cassette holder can easily be taken out from outside of the housing 10.

The film cassette loading and unloading device 4 basically operates as described above. Now, a process of loading a cassette of a different size, i.e., a smaller size, in the film cassette loading and unloading device 4 will be described below.

The lever 14 is laterally displaced from outside of the housing 10 to move the movable guide 74 toward the fixed guide 48 so that the space therebetween matches the size of the cassette CS to be inserted into the housing 10, as indicated by the solid lines in FIG. 3. The displacement of the lever 14 also displaces the plate 66 which is integrally coupled to the movable guide 74.

The pin 68 is displaced with the pin 70 under the tension of the coil spring 64, the coil spring 90 pulls the pin 88, and the pin 108 reaches the position shown in FIG. 3 under the tension of the coil spring 110. Since the cassette displacement limiting member 81 is also displaced, the collars 100, 111 disposed on the respective plates 66, 104 enter the bent portions 83a, 83b, respectively, of the cassette displacement limiting member 81. The collars 100, 111 are now prevented from being displaced further.

When the cassette CS of smaller size is introduced into the housing 10 through the opening 12, it pushes the locking finger 78 upwardly about the pin 76, and the distal end of the locking finger 78 is inserted into the locking hole 80. The movable guide 74 and the plates 66, 104 are fixedly positioned. The unlocking pins 96, 112 on the plate unlock the lid CSc of the cassette CS, which is then opened. The subsequent operation is the same as the operation described above with reference to the cassette CS of larger size.

With the present invention, as described above, even when a cassette of a different size is to be mounted, an opening which matches the size of the cassette can be created in the cassette loading and unloading device for the reception of the cassette according to an external operation, and a film accommodated in the cassette can be fed to a magazine in a light shielding condition through the cassette holder. After the film has been taken out of the cassette, the cassette is automatically returned to its original position and then discharged out of the cassette loading and unloading device. The cassette loading and unloading device according to the present invention is simpler in construction than a cassette loading and unloading device having belts and roller groups, and is also effective to hod the film accurately in position while the film is being fed toward the magazine. The cassette loading and unloading device is small in size, less costly to manufacture, and easy to handle.

Furthermore, the distance between the fixed guide and the movable guide for jointing holding a cassette therebetween can be adjusted by the lever which can be operated on outside of the cassette loading and unloading device. Therefore, cassettes having different sizes can selectively be loaded in the cassette loading and unloading device.

Insertion of a cassette into the cassette loading and unloading device actuates the lock means to prevent the movable guide from moving further. Therefore, a film accommodated in the cassette can stably and reliably be taken out of the cassette.

Still more, any of various differently sized cassettes which is loaded can be unlocked by the single device which is simple in structure, fully mechanical, and hence free from troubles. After the film has been taken out of the loaded cassette, the lid of the cassette is automatically closed, and the cassette is automatically unlocked, so that the cassette can easily be discharged from the cassette loaded and unloading device.

The cassette can be unloaded from the cassette loading and unloading device in a flat condition with the lid closed or open, through a simple arrangement.

The mechanism for closing the lid of the cassette is composed of the link mechanism and the plate that can be tilted by the link mechanism. The lid closing mechanism is thus simple in construction and reliable in operation.

As no suction system is employed to close the lid of the cassette, the cassette loading and unloading device may be small in size and car be serviced or maintained with ease.

Although a certain preferred embodiment has been shown and described, it should be understood that many changes and modifications may be made therein without departing from the scope of the appended claims.

What is claimed is:

1. A cassette loading and unloading device comprising:
   a pair of guides for supportably holding a cassette therebetween, said guides being relatively displaceable depending on a size of the cassette to be held therebetween;
   a cassette holder accommodating said guides and being pivotally and linearly movable to a position in which to open a lid of the cassette, while the cassette is being held by the guides; and
   a cassette holder displacing means for displacing said cassette holder to said position in which to open said lid and for returning said cassette holder to an original position and allowing the cassette to be removed from said guides.

2. A cassette loading and unloading device according to claim 1, wherein said guides include a fixed guide and a movable guide, said fixed guide and said movable guide being mounted on said cassette holder.

3. A cassette loading and unloading device according to claim 1, further including lock means for locking said guides against displacement with respect to said cassette holder in response to insertion of the cassette between said guides.

4. A cassette loading and unloading device according to claim 1, further including cassette displacement limiting means for limiting a position of the cassette between said guides in a direction in which the cassette is inserted between the guides.

5. A cassette loading and unloading device according to claim 1, wherein the cassette has a lock mechanism for locking the lid thereof, further including unlocking means for releasing said lock mechanism of the cassette which is held by said guides, thereby to unlock the lid of the cassette.

6. A cassette loading and unloading device according to claim 5, wherein said unlocking means comprises an unlocking bar for engaging a trailing end of the cassette and an unlocking pin for engaging a leading end of the cassette.

7. A cassette loading and unloading device according to claim 5, further including first moving means for displacing the lock mechanism of the cassette held by said guides toward said unlocking means, and second moving means for displacing said unlocking means depending on the size of the cassette.

8. A cassette loading and unloading device according to claim 7, wherein said guides include a fixed guide and a movable guide, said second moving means comprising a plate displaceable with said movable guide.

9. A cassette loading and unloading device according to claim 6, further including lid closing means for closing again the lid of the cassette which has been unlocked and opened.

10. A cassette loading and unloading device comprising:
    a pair of guides for supportably holding a cassette therebetween, said guides being relatively displaceable depending on a size of the cassette to be held therebetween;
    a cassette holder accommodating said guides and being movable to a position in which to open a lid of the cassette, while the cassette is being held by the guides;
    a cassette holder displacing means for displacing said cassette holder to said position in which to open said lid and for returning said cassette holder to an original position and allowing the cassette to be removed from said guides; and external operable means, actuable from outside of said cassette holder, for displacing the movable guide with respect to the fixed guide to define a space for receiving the cassette between said fixed guide and said movable guide.

11. A cassette loading and unloading device according to claim 10, wherein said externally operable means comprises a lever extending out of said cassette holder and a plate coupled to said lever, said plate being displaceable with respect to said cassette holder and supporting said movable guide.

12. A cassette loading and unloading device according to claim 11, further including a roller rotatably mounted on said plate, said cassette holder including a plate on which said roller is rollingly mounted.

13. A cassette loading and unloading device comprising:
- a pair of guides for supportably holding a cassette therebetween, said guides being relatively displaceable depending on a size of the cassette to be held therebetween;
- a cassette holder accommodating said guides and being movable to a position in which to open a lid of the cassette, while the cassette is being held by the guides;
- a cassette holder displacing means for displacing said cassette holder to said position in which to open said lid and for returning said cassette holder to an original position and allowing the cassette to be removed from said guides; and
- lock means for locking said guides against displacement with respect to said cassette holder in response to insertion of the cassette between said guides; wherein said cassette holder has a hole, said lock means comprising a locking finger mounted on said movable guide, said locking finger being angularly movable into said hole in response to insertion of the cassette between said guides.

14. A cassette loading and unloading device comprising:
- a pair of guides for supportably holding a cassette therebetween, said guides being relatively displaceable depending on a size of the cassette to be held therebetween;
- a cassette holder accommodating said guides and being movable to a position in which to open a lid of the cassette, while the cassette is being held by the guides;
- a cassette holder displacing means for displacing said cassette holder to said position in which to open said lid and for returning said cassette holder to an original position and allowing the cassette to be removed from said guides;
- cassette displacement limiting means for limiting a position of the cassette between said guides in a direction in which the cassette is inserted between the guides; and
- a plate displaceable with said guides, said cassette displacement limiting means comprising a first engaging member mounted on said cassette holder and a second engaging member mounted on said plate, said first and second engaging members being engageable with each other to limit the position of the cassette upon relative displacement of said guides.

15. A cassette loading and unloading device according to claim 14, wherein said first engaging member comprises a plate having a bent portion and said second engaging member comprises a collar which is positionable in said bent portion to limit the position of the cassette.

16. A cassette loading and unloading device comprising:
- a pair of guides for supportably holding a cassette therebetween, said guides being relatively displaceable depending on a size of the cassette to be held therebetween;
- a cassette holder accommodating said guides and being movable to a position in which to open a lid of the cassette, while the cassette is being held by the guides;
- a cassette holder displacing means for displacing said cassette holder to said position in which to open said lid and for returning said cassette holder to an original position and allowing the cassette to be removed from said guides; wherein said displacing means comprises a rotative drive source, a drive fork engaging said cassette holder, and rotative power transmitting means for transmitting rotative power of said rotative drive source to said drive fork.

17. A cassette loading and unloading device according to claim 16, further including an actuator displaceable in response to insertion of the cassette between said guides, and a sensor energizable in response to displacement of said actuator, for producing an output signal to energize said rotative drive source.

18. A cassette loading and unloading device comprising:
- a pair of guides for supportably holding a cassette therebetween, said guides being relatively displaceable depending on a size of the cassette to be held therebetween;
- a cassette holder accommodating said guides and being movable to a position in which to open a lid of the cassette, while the cassette is being held by the guides;
- a cassette holder displacing means for displacing said cassette holder to said position in which to open said lid and for returning said cassette holder to an original position and allowing the cassette to be removed from said guides;
- a lock mechanism for locking the lid thereof;
- unlocking means for releasing said lock mechanism of the cassette which is held by said guides, thereby to unlock the lid of the cassette;
- first moving means for displacing the lock mechanism of the cassette held by said guides toward said unlocking means, and second moving means for displacing said unlocking means depending on the size of the cassette; a rotative drive source; an arm supporting said unlocking bar; and rotative power transmitting means for transmitting rotative power from said rotative drive source to said arm, said first moving means being disposed on said rotative power transmitting means, for displacing said unlocking bar in unison with said arm to move the cassette to a position in which to unlock the lid of the cassette.

19. A cassette loading and unloading device comprising:
- a pair of guides for supportably holding a cassette therebetween, said guides being relatively displaceable depending on a size of the cassette to be held therebetween;

a cassette holder accommodating said guides and being movable to a position in which to open a lid of the cassette, while the cassette is being held by the guides;

a cassette holder displacing means for displacing said cassette holder to said position in which to open said lid and for returning said cassette holder to an original position and allowing the cassette to be removed from said guides;

a lock mechanism for locking the lid thereof;

unlocking means for releasing said lock mechanism of the cassette which is held by said guides, thereby to unlock the lid of the cassette, said unlocking means comprising an unlocking bar for engaging a trailing end of the cassette and an unlocking pin for engaging a leading end of the cassette; and lid closing means for closing again the lid of the cassette which has been unlocked and opened, wherein said lid closing means comprises a rotative drive source, a link rotatable by said rotative drive source and pressable against the lid of the cassette, and rotative power transmitting means for transmitting rotative power from said rotative drive source to said link to rotate said link into pressing engagement with the lid, thereby forcibly closing the lid.

20. A cassette loading and unloading device according to claim 19, further including means responsive to rotation of said rotative drive source for displacing said unlocking bar to move the cassette to a position in which to unlock the lid of the cassette.

21. A cassette loading and unloading device according to claim 19, further including a roller mounted on an end of said link and engaging the lid of the cassette.

22. A cassette loading and unloading device comprising:

a pair of guides for supportably holding a cassette therebetween, said guides being relatively displaceable depending on a size of the cassette to be held therebetween;

a cassette holder accommodating said guides and being movable to a position in which to open a lid of the cassette, while the cassette is being held by the guides;

a cassette holder displacing means for displacing said cassette holder to said position in which to open said lid and for returning said cassette holder to an original position and allowing the cassette to be removed from said guides; wherein said displacing means comprises a drive source, swingable holding means for holding said cassette holder, and power transmitting means for transmitting power from said drive source to said holding means to swing said holding means to return said cassette holder to the original position thereof.

23. A cassette loading and unloading device according to claim 22, wherein said displacing means further includes a guide member for guiding displacement of said cassette holder, said holding means comprising a drive fork engaging said cassette holder, said drive source comprising a rotative drive source for angularly moving said drive fork through said power transmitting means to return said cassette holder to the original position along said guide member.

24. A cassette loading and unloading device according to claim 23, wherein said guide member has a guide groove defined therein, said cassette holder having a pin movably fitted in said guide groove, said fork member engaging said pin.

* * * * *